UNITED STATES PATENT OFFICE.

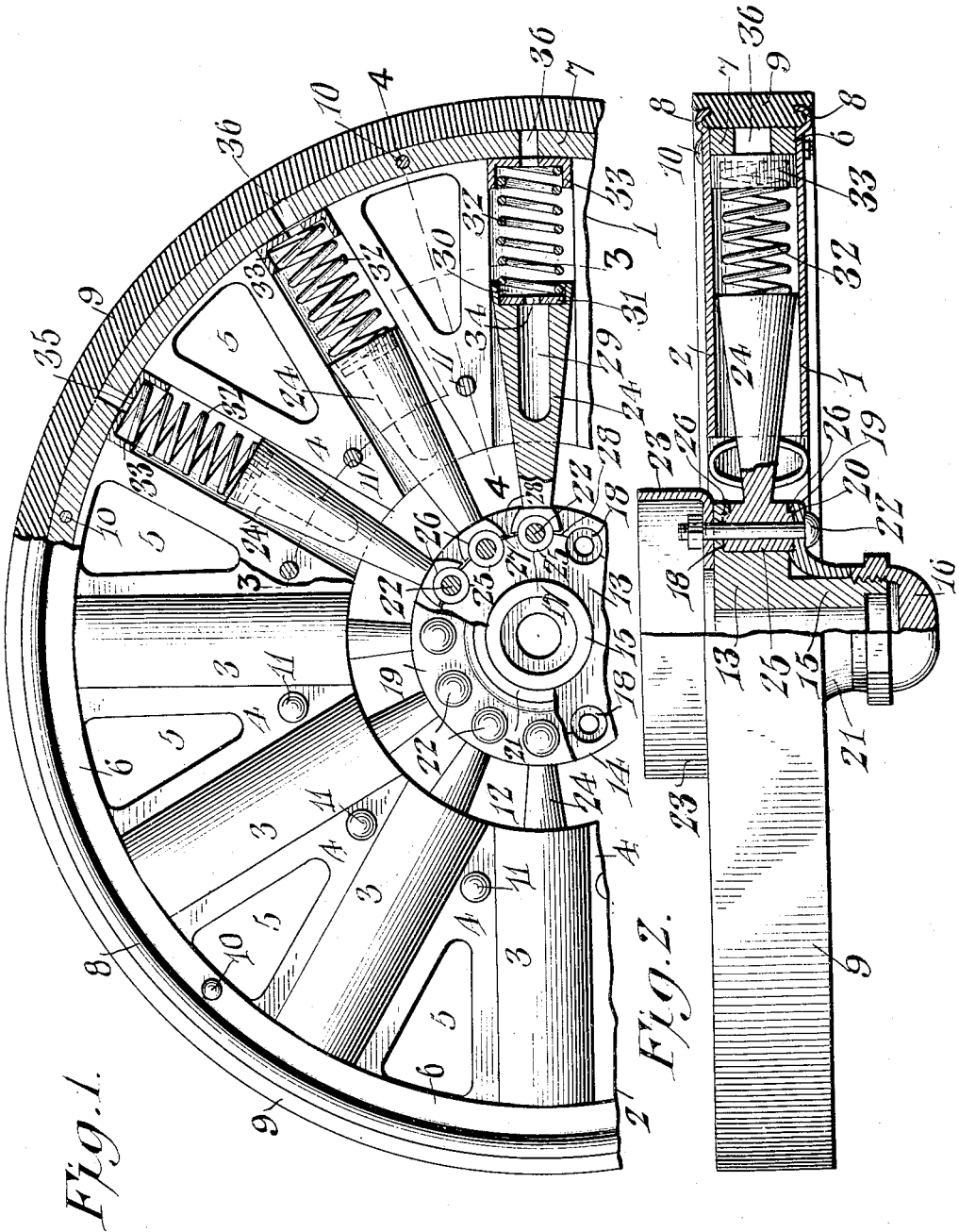
H. V. SOUDERS.
VEHICLE WHEEL.
APPLICATION FILED NOV. 29, 1911.
1,039,607.
Patented Sept. 24, 1912.
2 SHEETS—SHEET 1.
Herbert V. Souders, Inventor H. V. SOUDERS.
VEHICLE WHEEL.
APPLICATION FILED NOV. 29, 1911.
1,039,607.
Patented Sept. 24, 1912.
2 SHEETS—SHEET 2.
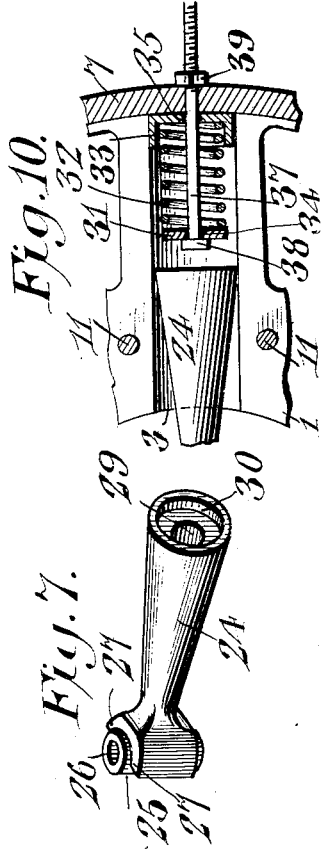
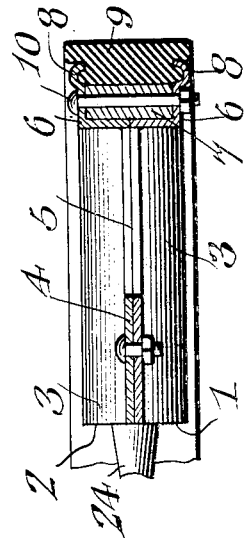
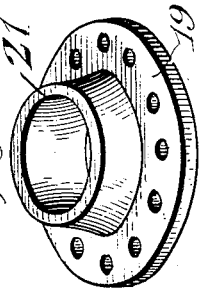
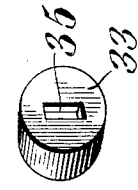
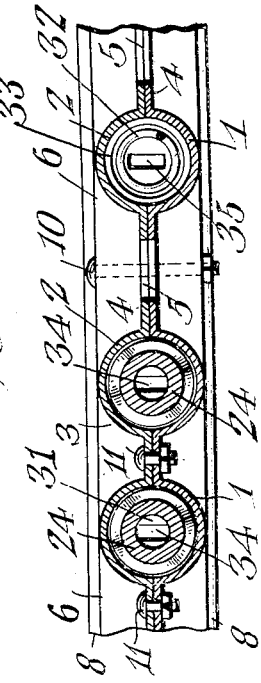
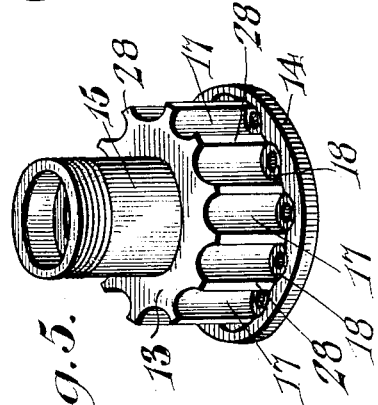
Witnesses
Jas. K. McCathran
F. T. Chapman.
Herbert V. Souders, Inventor
By E. G. Siggers
Attorney

HERBERT VANCE SOUDERS, OF BAKERSFIELD, CALIFORNIA.

VEHICLE-WHEEL.

1,039,607.

Specification of Letters Patent. Patented Sept. 24, 1912.

Application filed November 29, 1911. Serial No. 663,100.

*To all whom it may concern:*

Be it known that I, HERBERT V. SOUDERS, a citizen of the United States, residing at Bakersfield, in the county of Kern and State of California, have invented a new and useful Vehicle-Wheel, of which the following is a specification.

This invention has reference to improvements in vehicle wheels and its object is to produce an elastic or spring wheel designed to possess the elasticity of a pneumatically tired wheel without the necessity of the use of a pneumatic tire.

In accordance with the present invention there is provided a wheel which may be an all metal wheel with the exception of a felly or tire and the latter may be of some material designed to deaden sound, a material such as rubber fabric or leather answering the purpose, but where the deadening of sound is not of importance the tread portion of the wheel may be of metal. The main body of the wheel may be constructed of pressed sheet metal providing radial tubular portions in which are housed springs and spokes, the latter being carried by a hub member central to the body of the wheel but separated therefrom by a sufficient space to permit a relative movement between the hub and the body of the wheel while the spokes are so shaped and connected to the hub that they may have a movement radial to the body of the wheel and also a limited orbital movement about the axis of the hub as a center.

The invention will be best understood from a consideration of the following detailed description, taken in connection with the accompanying drawings forming a part of this specification, with the understanding, however, that while the showing of the drawings is of a practical embodiment of the invention the latter is susceptible of various changes and modifications and, therefore, the invention is not limited to any exact conformity with the showing of the drawings, but may be changed and modified so long as the salient features of the invention are retained and the result sought obtained.

Referring to the drawings:—Figure 1 is an elevation with parts in section of a portion of a wheel constructed in accordance with the present invention. Fig. 2 is a plan view of the wheel with a portion in section on a radial axial plane. Fig. 3 is a section on the line 3—3 of Fig. 1. Fig. 4 is a section on the line 4—4 of Fig. 1. Fig. 5 is a perspective view of a portion of the hub. Fig. 6 is a perspective view of another portion of the hub. Fig. 7 is a perspective view of one of the spokes. Fig. 8 is a perspective view of a washer used in connection with each spoke. Fig. 9 is a perspective view of a cup used in connection with a spring member individual to each spoke. Fig. 10 is a section in a plane perpendicular to the axis of rotation of the wheel showing the manner of retaining the springs preparatory to the introduction of the spokes.

Referring to the drawings, there is shown an annular body member made up of side plates 1, 2, which for lightness of construction may be made of sheet metal suitably pressed into shape so that when the two side plates are brought together there is formed a circular series of radial cylinders 3 with connecting webs 4 between them, and these webs are pierced by passages 5 serving to correspondingly reduce the weight of the body of the wheel. The peripheral portion of the side members 1 and 2 is formed into a channel portion 6 in which may be lodged a felly 7, and exterior to the felly the peripheral portion 6 of each side member is bent into an annular bead 8 with the grooved portion of one bead presented toward the grooved portion of the other, whereby there may be lodged a tire 9 on the felly held in place by the inturned edges of the beads 8. This tire may be formed of rubber, leather, or other suitable material where noise is to be avoided and may be formed of steel where noise is not material. The side members 1 and 2 are secured together by bolts 10 or like fastening devices traversing the side members and the felly and are further secured together by other bolts 11 or like fastening devices traversing the webs 4 near the inner margin of the body of the wheel. Such inner margin of the body of the wheel is sufficiently spaced from the axis of the wheel to leave an opening 12 sufficient to accommodate a hub and permit a considerable relative movement between the hub and the body of the wheel. In the particular instance shown the hub is in the form of a generally cylindrical block 13 having at one end a radial flange 14 and at the other end an axial extension 15 while through the block 13, flange 14 and extension 15 there is a central passage for a vehicle axle, the free end of the extension 15 being threaded for the application of a cap nut 16 usually found in structures of this character. The hub body 13 is provided with a peripheral series of semi-circular recesses 17 extending into the flange 14 in the form of circular recesses 18. Adapted to the end of the body portion 13 remote from the flange 14 is a plate 19 similar to the flange 14 and like the latter provided with circular recesses 20. The plate 19 has a central neck 21 of a length to project along the extension 15 and be abutted by the nut 16. The flange 14 central to the recesses 18 and the plate 19 central to the recesses 20 are perforated for the passage of bolts or pins 22, which, when in place, are axial to the recesses 17 and these bolts may also serve to hold a brake drum 23 to that side of the hub remote from the nut 16.

Adapted to the interior of the cylinders 3 are spoke members 24 of elongated conical configuration and at the smaller end these spoke members are expanded and terminate in semi-cylindrical members 25 adapted to seat in the recesses 17 and are at the ends formed cylindrical as indicated at 26 to seat in the respective recesses 18 and 20. The smaller end of each spoke is formed on opposite sides of the cylindrical portion 25 with shoulders 27 adapted to engage peripheral portions 28 of the hub body 13 between the recesses 17, the latter being sufficiently spaced for the purpose, but the shoulders 27 are so related to the cylindrical portions 25 that the spokes may have a limited turning movement about the axis of the pins or bolts 22 before being stopped by the engagement of a shoulder 27 with the corresponding peripheral portion 28 of the hub body 13. The spokes 24 may be hollowed out as indicated at 29 for the purpose of lightness and at their broader ends these spokes are each countersunk, as indicated at 30, for the reception of a washer 31 constituting a bearing plate for one end of a spring 32 housed in the respective cylinder 3, while the other end of the spring engages in a cup 33 bearing against the felly 7. Each washer 31 is formed with a slot 34 longer in one direction than the other and each cup 33 is formed with a similar slot 35 and the felly 7 is formed in the line of the axis of each cylinder 3 with a slot 36 similar to the slots 34 and 35. These several slots are designed to receive a bolt 37, shown in Fig. 10, which bolt is provided with a head 38 shaped to pass through any one of the slots 34, 35 and 36, but when given a quarter turn cannot then pass through the slots, wherefore the bolt may be readily introduced in or removed from any one of the cylinders 3 through a slot 36 and through the cup 33 and washer 31 and also through the center of a spring lodged between a cup and washer and then on giving the bolt a quarter turn a nut 39 may be applied thereto to draw the bolt outward with respect to the felly, thereby compressing the spring to such an extent that the corresponding spoke 24 may be introduced into a cylinder 3 from the inner or axial end thereof without interference from the spring.

When all the springs and spokes have been placed in position the nuts 39 may be removed and the springs allowed to expand until the washers 31 are seated in the countersinks 30 at the wider ends of the spokes, after which the bolts may be given a quarter turn, the cavities 29 permitting such movement and may then be withdrawn from the cylinders 3 by way of the passages 36. Now, the tire 9 may be placed in position, one of the plates 1 or 2 not yet having been applied, and when the plate is applied and bolted or otherwise secured in place the wheel is completed, the smaller ends of the spokes being held by the cylindrical members 25 and pins or bolts 22 firmly to the hub, the recesses 18 and 20 taking the strain off of the bolts 22. If now the wheel be applied to a vehicle, the weight of the latter will be borne by the springs near the ground or other support for the wheel, such weight being distributed over several of the springs, and those spokes which are horizontal or near the horizontal position will move with the hub, the larger or outer ends of the spokes within the cylinders 3 turning on their edges, while the inner or smaller ends of the spokes turn on the bolts 22 as axes, the arrangement being such that the turning movement of the spokes on the bolts 22 is arrested by the engagement of the shoulders 27 with the peripheral portions 28 of the hub as the taper sides of the spokes engage the corresponding inner walls of the cylinders 3, this movement being most pronounced at those spokes which at the time are horizontal, while those which are at the time vertical remain so although they may move longitudinally due to the yielding of the supporting springs. Suppose, now, that power be applied to the wheel hub to rotate the wheel, then the hub will begin to turn independently of the body of the wheel until finally the spokes come in contact with the inner side walls of the cylinders 3 and the shoulders 27 engage the peripheral portions 28 of the hub. This will cause a rotative movement of the wheel provided the rotative impulses continue with respect to the hub, but the displacement of the hub with respect to the body of the wheel due to the weight of the vehicle will cause those spokes which are at the time uppermost or lowermost to assume a position more nearly central to the cylinders 3 than the other spokes because of the eccentric relation of the hub to the body of the wheel, this eccentric relation being modified by the rotative impulse imparted to the hub.

It is found that the taper form of the spokes, the cylindrical form of the cylinders or sockets into which the outer ends of the spokes extend and the pivotal mounting of the spokes of the hub all contribute to relieve those spokes which bear the weight from frictional strains which tend to interfere with the elastic action of the springs.

It will be seen that the hub and spokes have no positive connection with the body of the wheel but are in floating relation thereto, thus contributing markedly to the elasticity of the wheel when in use.

What is claimed is:—

1. A vehicle wheel comprising a body member provided with a felly and with radial cylindrical sockets extending from the felly and opening toward the center of the wheel, a hub, spokes each having one extremity pivotally connected directly to the hub and the other extremity laterally expanded and there entering and freely movable lengthwise of a respective socket, and springs within the sockets between the expanded ends of the spokes and the ends of said sockets remote from the hub and constituting the sole elastic elements of the wheel.

2. A vehicle wheel comprising a body portion provided with a felly and radial cylindrical sockets extending from the felly toward the center of the wheel, a hub, tapered spokes each having the smaller end pivotally connected to the hub and the larger end entering the inner end of a corresponding socket and movable lengthwise of said socket, said larger ends being of substantially the same diameter as the interior diameter of the sockets and the latter being freely open at their inner ends, and a spring in each socket between the larger end of the respective spoke and the end of the socket remote from the hub, said springs constituting the sole elastic elements of the wheel.

3. A vehicle wheel comprising a body portion having radial sockets therein, a hub, tapered spokes having the larger ends entering the sockets and the smaller ends pivotally connected to the hub, said spokes having shoulders for limiting the movement of the spokes on their pivots, and springs in the sockets between the larger ends of the spokes and those ends of the sockets remote from the hub.

4. A vehicle wheel comprising a body portion having radial sockets, a hub having curved recesses with terminal circular extensions, taper spokes with smaller ends adapted to the recesses in the hub and with the larger ends entering the sockets in the body portion of the wheel, the said smaller ends of the spokes each having a passage therethrough transverse to the longitudinal axis of the spoke, a pivot pin for each spoke traversing said passage and carried by the hub, and springs within the sockets between the larger ends of the spokes and those ends of the sockets remote from the hub.

5. A vehicle wheel comprising a body portion having radial sockets, a hub provided with axial recesses of substantially semicircular form with terminal circular portions, taper spokes having their larger ends extending into the sockets of the body of the wheel and the smaller ends rounded to fit the semicircular recesses and provided with circular extensions adapted to the circular extensions of the recesses in the hub, said spokes being also provided with shoulders on opposite sides of the rounded extremities to engage the hub to limit movement of the spokes with relation to the hub, and springs housed in the sockets in the body of the wheel between the larger ends of the spokes and the outer ends of the sockets.

6. A vehicle wheel comprising a body portion formed of matching plates secured together face to face and shaped to form a circular series of radial sockets, a hub having a body portion with a circular series of axially disposed semicircular recesses and end portions with circular recesses constituting continuations of the semicircular recesses, taper spokes having their larger ends toward the periphery of the wheel and seated in the sockets in the main portion of the wheel and the smaller ends rounded in conformity with the semicircular recesses and provided with rounded lateral continuations conforming to the circular recesses in the hub, said spokes having shoulders adjacent the rounded extremities adapted to engage the hub between the semicircular recesses, and springs housed in the sockets in the main portion of the wheel between the outer ends of the spokes and the outer ends of the sockets.

7. In a vehicle wheel, a body portion provided with a felly and with radial sockets extending from said felly toward the center of the wheel, a hub member, spokes carried by the hub member and extending into the sockets, springs in the sockets between the spokes and the outer ends of the sockets, cups housing the ends of the springs adjacent the outer ends of the sockets, and washers between the springs and the spokes, the cups and washers being each provided with elongated slots, the felly being provided with openings in coöperative relation to the elongated slots in the cups.

In testimony, that I claim the foregoing as my own, I have hereto affixed my signature in the presence of two witnesses.

HERBERT VANCE SOUDERS.

Witnesses:
WALTER DUNBAR,
CHRISTIAN NELSON.